US012562364B2

(12) United States Patent
Hong et al.

(10) Patent No.: US 12,562,364 B2
(45) Date of Patent: Feb. 24, 2026

(54) ELECTRODE SLURRY COATING SYSTEM CAPABLE OF CONTROLLING THE FLOW RATE OF ELECTRODE SLURRY AND ELECTRODE SLURRY COATING METHOD USING THE SAME

(71) Applicant: LG Energy Solution, Ltd., Seoul (KR)

(72) Inventors: Seong Wook Hong, Daejeon (KR); Dong Hun Song, Daejeon (KR); Hyun Woo Choi, Daejeon (KR); Sang Hoon Choy, Daejeon (KR); Shin Wook Jeon, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 741 days.

(21) Appl. No.: 17/915,649

(22) PCT Filed: Dec. 22, 2021

(86) PCT No.: PCT/KR2021/019628
§ 371 (c)(1),
(2) Date: Sep. 29, 2022

(87) PCT Pub. No.: WO2022/149764
PCT Pub. Date: Jul. 14, 2022

(65) Prior Publication Data
US 2023/0118784 A1     Apr. 20, 2023

(30) Foreign Application Priority Data

Jan. 11, 2021     (KR) ........................ 10-2021-0003160

(51) Int. Cl.
*H01M 4/04*          (2006.01)
(52) U.S. Cl.
CPC ................................. *H01M 4/0435* (2013.01)

(58) Field of Classification Search
CPC .... H01M 4/0435; H01M 4/505; H01M 4/525; H01M 10/052; H01M 4/0404;
(Continued)

(56) References Cited

U.S. PATENT DOCUMENTS

2007/0248745 A1     10/2007   Wakai et al.
2009/0022890 A1     1/2009    Takahashi et al.
(Continued)

FOREIGN PATENT DOCUMENTS

CN          101396685 A        4/2009
CN          102641822 A        8/2012
(Continued)

OTHER PUBLICATIONS

KR-20190030284-A Translation (Year: 2019).*
(Continued)

*Primary Examiner* — Matthew T Martin
*Assistant Examiner* — Kevin Song
(74) *Attorney, Agent, or Firm* — Lerner David LLP

(57)          ABSTRACT

An electrode slurry coating system and a method of using the same to coat a current collector layer are disclosed herein. In some embodiments, the electrode slurry coating system includes a supply tank, a supply line having a control valve and branching into at least three sub-supply lines at one end thereof, an electrode slurry slot die having a manifold, a coating roller, and a temperature sensor, wherein the temperature is sensor configured to measure the temperature of the electrode slurry discharged from the electrode slurry slot die, and wherein the control valve is configured to control the flow rate of the electrode slurry in response to a temperature of the electrode slurry measured by the temperature sensor.

13 Claims, 5 Drawing Sheets

(58) Field of Classification Search
CPC ............. B05C 11/1007; B05C 11/1018; B05C
5/0254; Y02E 60/10
See application file for complete search history.

(56) References Cited

U.S. PATENT DOCUMENTS

| | | | |
|---|---|---|---|
| 2011/0097476 A1 | 4/2011 | Ishizu et al. | |
| 2013/0327028 A1* | 12/2013 | Steele ...................... | C10J 3/526 |
| | | | 60/327 |
| 2014/0377451 A1 | 12/2014 | Kim et al. | |
| 2016/0168709 A1* | 6/2016 | De Vries ................... | B05C 3/02 |
| | | | 427/256 |
| 2019/0081317 A1* | 3/2019 | Keil .......................... | B05C 9/12 |
| 2019/0390315 A1* | 12/2019 | Yonekura .................. | C23C 2/52 |

FOREIGN PATENT DOCUMENTS

| | | | |
|---|---|---|---|
| CN | 106125694 A | 11/2016 | |
| EP | 2017013 A2 | 1/2009 | |
| JP | 2000005685 A | 1/2000 | |
| JP | 2009233518 A | 10/2009 | |
| JP | 2012138302 A | 7/2012 | |
| JP | 4989909 B2 | 8/2012 | |
| JP | 2013140680 A | 7/2013 | |
| JP | 2014160564 A | 9/2014 | |
| JP | 2017183010 A | 10/2017 | |
| JP | 2018114487 A | 7/2018 | |
| JP | 6422711 B2 | 11/2018 | |
| JP | 2019081148 A | 5/2019 | |
| KR | 20060111848 A | 10/2006 | |
| KR | 20120047426 A | 5/2012 | |
| KR | 20120095159 A | 8/2012 | |
| KR | 20140148246 A | 12/2014 | |
| KR | 20190030284 A * | 3/2019 | ......... B05C 11/1002 |
| KR | 20200117593 A | 10/2020 | |
| WO | 0047337 A1 | 8/2000 | |
| WO | 2015141391 A1 | 9/2015 | |

OTHER PUBLICATIONS

International Search Report for PCT/KR2021/019628 mailed Apr. 11, 2022. 3 pgs.
Search Report dated Nov. 15, 2024 from the Notice of Allowance for Chinese Application No. 202180024707.4 issued Dec. 12, 2024, 2 pages.
Extended European Search Report for Application No. 21917926.4 dated Sep. 12, 2023, pp. 1-5.

* cited by examiner

【FIG. 1】
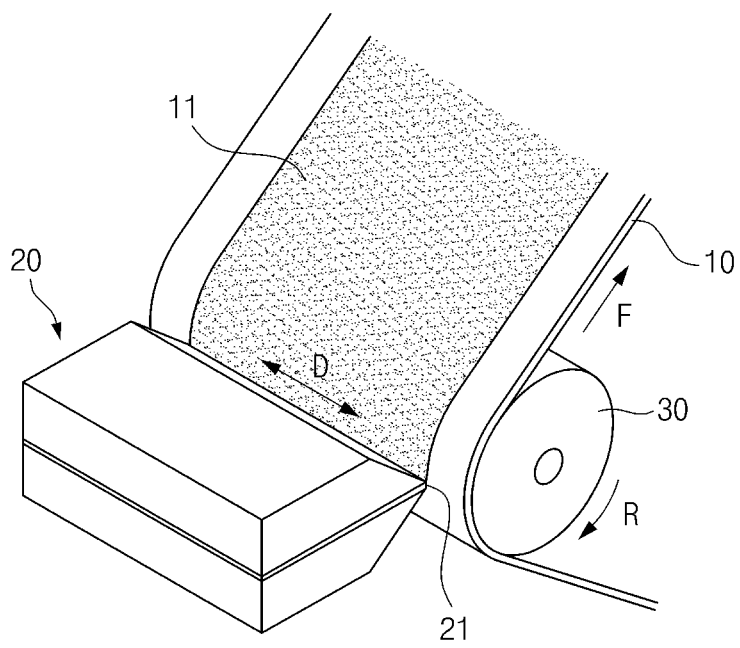
Prior Art

【FIG. 2】
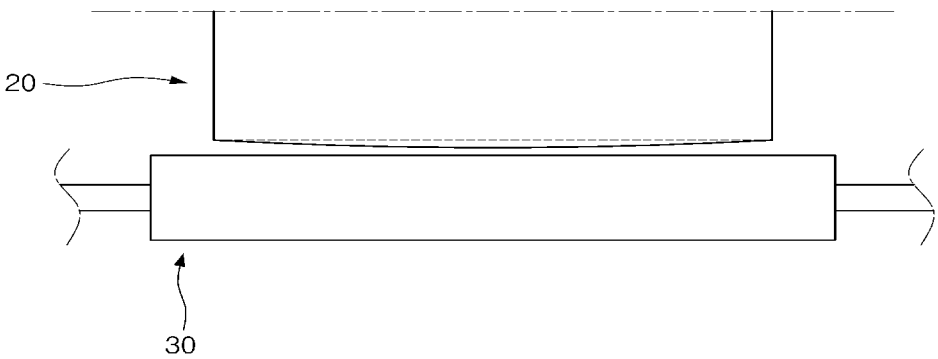
20
30
Prior Art
【FIG. 3】
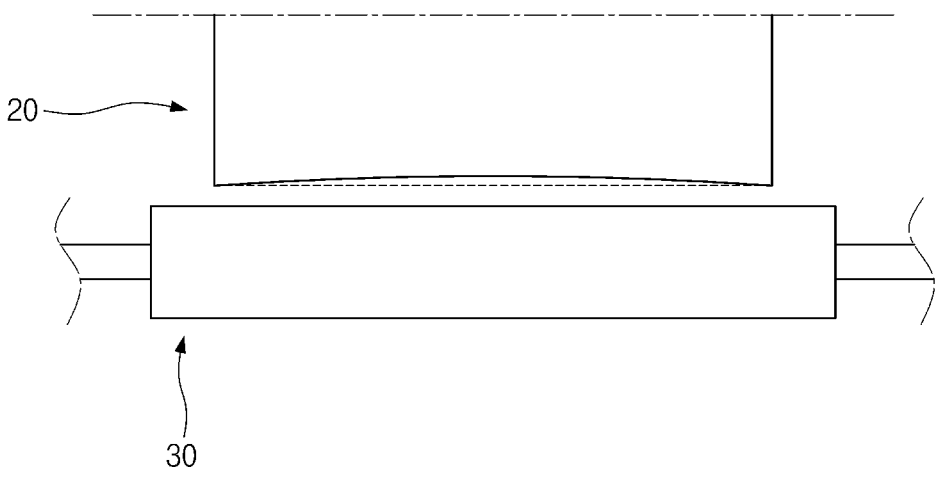
20
30
Prior Art

【FIG. 4】
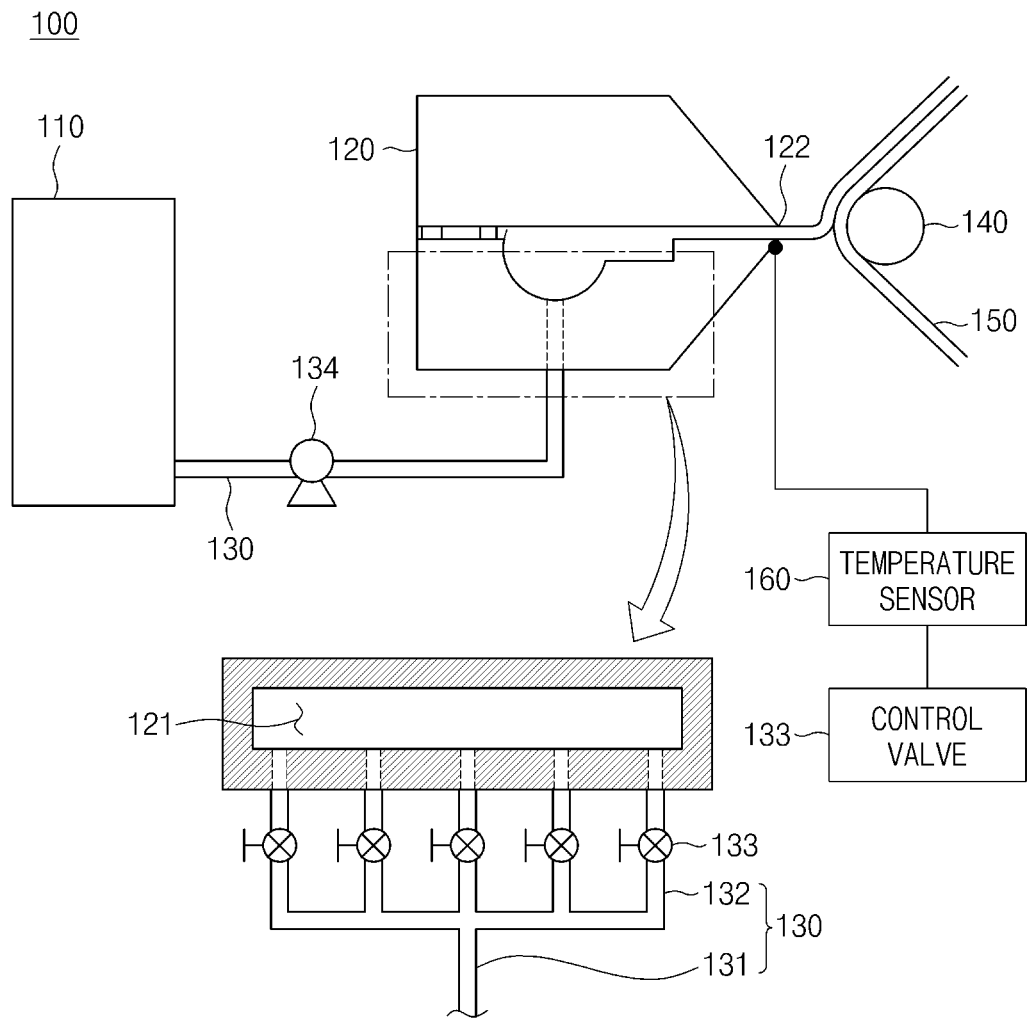

【FIG. 5】
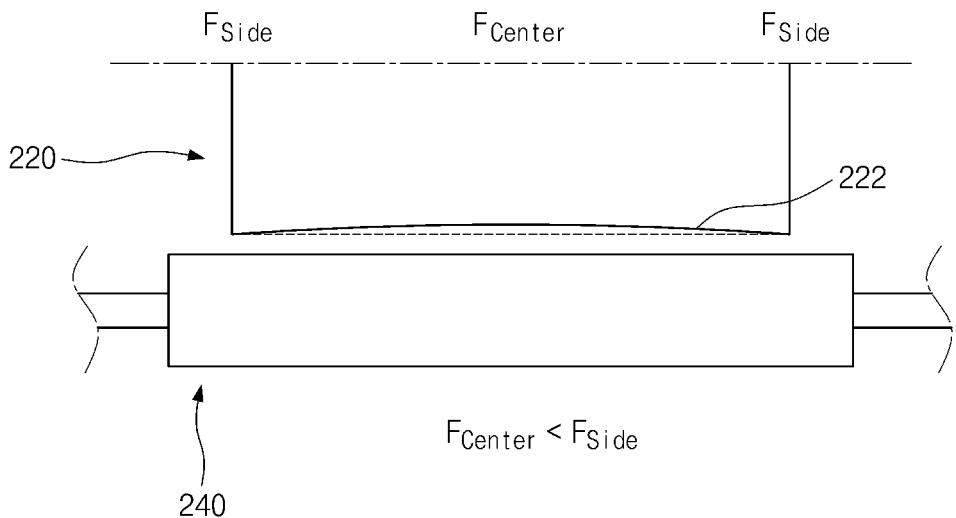
【FIG. 6】
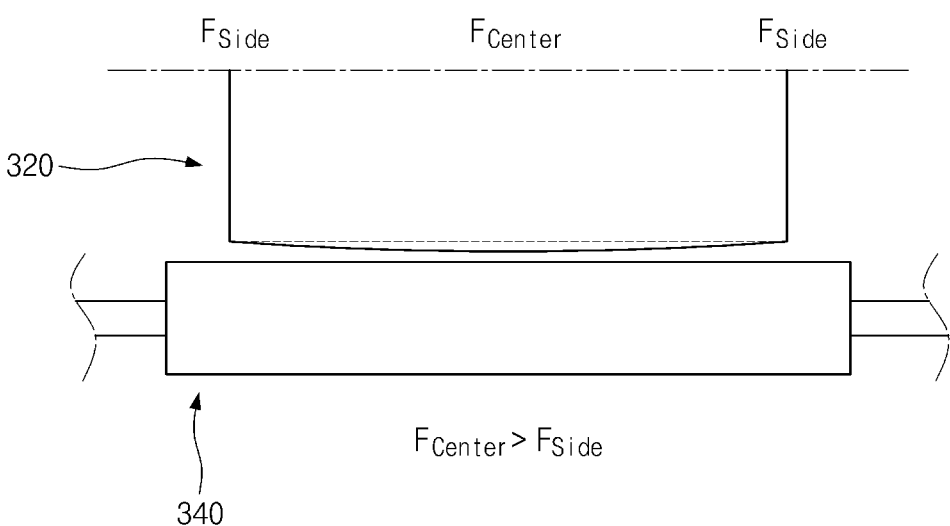

【FIG. 7】
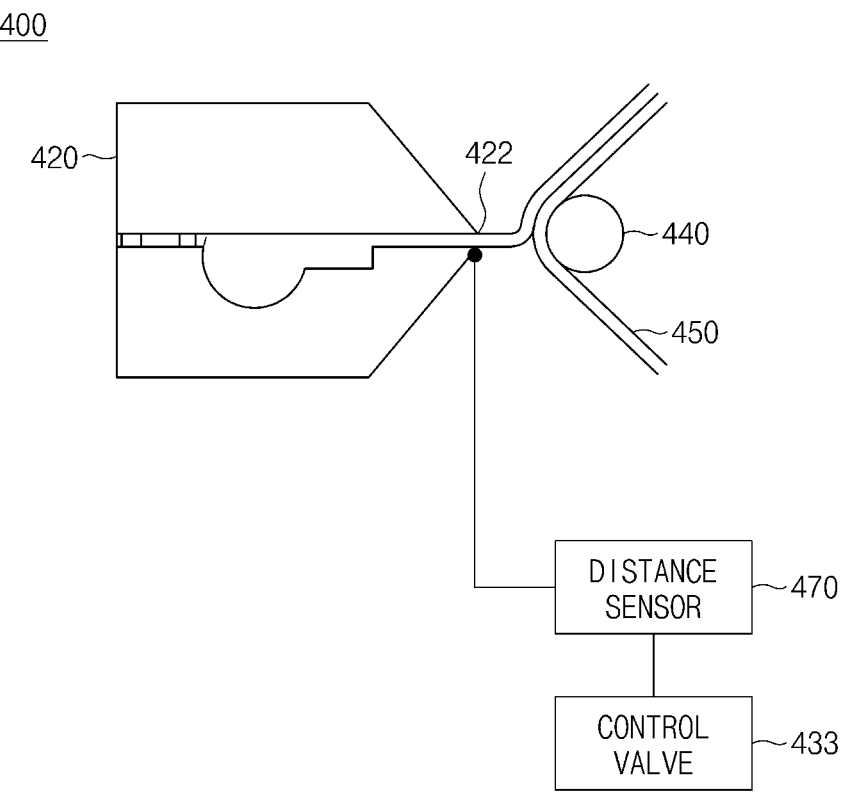

ELECTRODE SLURRY COATING SYSTEM CAPABLE OF CONTROLLING THE FLOW RATE OF ELECTRODE SLURRY AND ELECTRODE SLURRY COATING METHOD USING THE SAME

CROSS-REFERENCE TO RELATED APPLICATIONS

This application is a national phase entry under 35 U.S.C. § 371 of International Application No. PCT/KR2021/019628, filed on Dec. 22, 2021, which claims priority from Korean Patent Application No. 10-2021-0003160, filed on Jan. 11, 2021, and the entire contents of which are incorporated by reference herein.

TECHNICAL FIELD

The present disclosure relates to an electrode slurry coating system capable of controlling the flow rate of electrode slurry and an electrode slurry coating method using the same.

BACKGROUND ART

With the development of technology and the increase in demand for mobile devices, the demand for secondary batteries is also rapidly increasing. Among the secondary batteries, a lithium secondary battery is widely used as an energy source for various electronic products as well as various mobile devices in that it has high energy density, high operating voltage, and excellent preservation and lifetime characteristics.

As the application field of secondary batteries is widening, the demand for higher-capacity secondary batteries is rapidly increasing. As a method of increasing the capacity of a secondary battery, research is being conducted on a technique for increasing the loading amount of an electrode mixture layer. Electrodes for secondary batteries are manufactured through drying and rolling processes after coating an electrode slurry on a current collector. However, in order to increase the loading amount of an electrode mixture layer, a large amount of electrode slurry should be coated on the current collector. A higher level of coating uniformity is required so as to increase the coating amount of the electrode slurry.

FIG. 1 is a diagram showing a conventional electrode manufacturing process. FIG. 1 illustrates a process of discharging an electrode slurry, through an electrode slurry slot die, onto an electrode current collector positioned on a coating roller. In FIG. 1, an electrode slurry slot die 20 discharges an electrode slurry onto an electrode current collector 10 that passes over a coating roller 30 rotating in one direction R. The electrode current collector 10 is transferred in the machine direction (MD) F while passing over the coating roller 30 rotating in one direction R. The electrode slurry slot die 20 forms an electrode mixture layer 11 coated with the electrode slurry to a specific width D on the electrode current collector 10 by discharging and drying the electrode slurry on the electrode current collector 10 through an electrode slurry discharge unit 21.

Meanwhile, the electrode slurry discharged from the electrode slurry slot die 20 has a temperature change induced within a certain range due to a variable such as a heating time or step by step in the process. The temperature change of the electrode slurry induces a minute displacement or deformation of the electrode slurry discharge unit 21, which causes the thickness of the electrode mixture layer 11 to be non-uniform.

FIGS. 2 and 3 are diagrams schematically showing the deformation of the electrode slurry slot die according to the temperature of the electrode slurry during conventional electrode manufacturing. In general, when the temperature of the electrode slurry is lower than a reference temperature (23° C.) during electrode manufacturing, the discharge unit is contracted to a greater degree on both sides than at the center (see FIG. 2). On the other hand, when the temperature of the electrode slurry discharged from the slot die is higher than the reference temperature (23° C.), the discharge unit is expanded to a greater degree on both sides than at the center (see FIG. 3).

When the shape of the electrode slurry slot die 20 is deformed as described above, the distance between the coating roller 30 and the electrode slurry discharge unit 21 is not constant with respect to the transverse direction (TD) of the coating roller. In this case, there is a problem in that the loading amount of the slurry to be coated on the current collector 10 is also not constant with respect to the TD of the coating roller. Specifically, as the distance between the electrode slurry discharge unit 21 and the coating roller 30 increases, the loading amount of the slurry coated on the current collector 10 may increase. Referring to FIG. 3, based on the coating roller 30, the loading amount of the slurry at the center is greater than those on the sides.

Accordingly, there is a need for a technology capable of controlling the loading amount of electrode slurry discharged from the slot die in response to the temperature of the electrode slurry during electrode slurry coating.

DISCLOSURE

Technical Problem

The present disclosure was devised to solve the above problems and is directed to providing an electrode slurry coating system that is capable of controlling the flow rate of electrode slurry discharged from a slot die during electrode slurry coating and that can control the loading amount of the electrode slurry in response to the temperature of the electrode slurry and an electrode manufacturing method using the same.

Technical Solution

The present disclosure provides an electrode slurry coating system. In one example, an electrode slurry coating system according to the present disclosure is configured to include a supply tank configured to supply an electrode slurry, a supply line configured to supply the electrode slurry, received from the supply tank, to a manifold of an electrode slurry slot die, the supply line branched into n (n is an integer greater than or equal to three) sub-supply lines in a traverse direction (TD), wherein a center and sides of the manifold are arranged with respect to the TD, an electrode slurry slot die configured to discharge the electrode slurry supplied through the supply line, a coating roller configured to support and transfer a current collector layer, the current collector layer transferred along the coating roller and having one or both sides coated with the electrode slurry discharged from the electrode slurry slot die, and a temperature sensor configured to measure the temperature of the electrode slurry discharged from the electrode slurry slot die. In this case, a control valve configured to control the flow rate of the electrode in response to a temperature of the electrode slurry measured by the temperature sensor.

In a specific example, when the temperature of the electrode slurry measured by the temperature sensor exceeds a preset reference temperature, the control valve controls the flow rate of electrode slurry supplied through each supply line to satisfy Equation 1 below.

$$F_{center} < F_{side} \qquad \text{[Equation 1]}$$

In Equation 1, $F_{center}$ denotes the flow rate of electrode slurry discharged from a sub-supply line installed at the center of the manifold with respect to the TD, and $F_{side}$ denotes the flow rate of electrode slurry discharged from a sub-supply line installed on a side of the manifold with respect to the TD.

In another specific example, when the temperature of the electrode slurry measured by the temperature sensor is less than a preset reference temperature, the control valve controls the flow rate of electrode slurry supplied through each supply line to satisfy Equation 2 below.

$$F_{center} > F_{side} \qquad \text{[Equation 2]}$$

In Equation 2, $F_{center}$ denotes the flow rate of electrode slurry discharged from a sub-supply line installed at the center of the manifold with respect to the TD, and $F_{side}$ denotes the flow rate of electrode slurry discharged from a sub-supply line installed on the side of the manifold with respect to the TD.

In another example, the electrode slurry slot die in the electrode slurry coating system according to the present disclosure further includes k (k is an integer greater than or equal to three) distance sensors arranged along the TD in an electrode slurry discharge unit from which an electrode slurry is discharged. In this case, the distance sensors may measure a gap between the electrode slurry discharge unit and a surface of the coating roller. In addition, the multiple distance sensors may be arranged in the electrode slurry discharge unit and positioned upstream with respect to a traveling direction of a current collector.

In a specific example, when the gap $G_{center}$ measured by the distance sensor installed at the center of the slurry discharge unit is greater than the gap $G_{side}$ measured by the distance sensor installed on the side of the slurry discharge unit with respect to the TD, the control valve controls the flow rate of the electrode slurry supplied through each supply line to satisfy Equation 1 below.

$$F_{center} < F_{side} \qquad \text{[Equation 1]}$$

In Equation 1, $F_{center}$ denotes the flow rate of electrode slurry discharged from a sub-supply line installed at the center of the manifold with respect to the TD, and $F_{side}$ denotes the flow rate of electrode slurry discharged from a sub-supply line installed on a side of the manifold with respect to the TD.

In another specific example, when the gap $G_{center}$ measured by the distance sensor installed at the center of the slurry discharge unit is smaller than the gap $G_{side}$ measured by the distance sensor installed at the side of the slurry discharge unit with respect to the TD, the control valve controls the flow rate of the electrode slurry supplied through each supply line to satisfy Equation 2 below.

$$F_{center} > F_{side} \qquad \text{[Equation 2]}$$

In Equation 2, $F_{center}$ denotes the flow rate of electrode slurry discharged from a sub-supply line installed at the center of the manifold with respect to the TD, and $F_{side}$ denotes the flow rate of electrode slurry discharged from a sub-supply line installed on a side of the manifold with respect to the TD.

In an example, the supply line of the electrode slurry coating system according to the present disclosure has a structure in which a single line protrudes from the supply tank and is branched into n sub-supply lines and coupled to the manifold of the electrode slurry slot die. In addition, the supply line may include at least one pump configured to pump the electrode slurry from the supply tank to the electrode slurry slot die.

Furthermore, the present disclosure provides an electrode slurry coating method using the above-described electrode slurry coating system. In one example, the electrode slurry coating method according to the present disclosure controls the flow rate of electrode slurry supplied through each supply line according to the temperature of electrode slurry measured by a temperature sensor.

In a specific example, when the temperature of the electrode slurry measured by the temperature sensor exceeds a preset reference temperature, the control valve controls the flow rate of electrode slurry supplied through each supply line to satisfy Equation 1 below.

$$F_{center} < F_{side} \qquad \text{[Equation 1]}$$

In Equation 1, $F_{center}$ denotes the flow rate of electrode slurry discharged from a sub-supply line installed at the center of the manifold with respect to the TD, and $F_{side}$ denotes the flow rate of electrode slurry discharged from a sub-supply line installed on a side of the manifold with respect to the TD.

In another specific example, when the temperature of the electrode slurry measured by the temperature sensor is less than a preset reference temperature, the control valve controls the flow rate of electrode slurry supplied through each supply line to satisfy Equation 2 below.

$$F_{center} > F_{side} \qquad \text{[Equation 2]}$$

In Equation 2, $F_{center}$ denotes the flow rate of electrode slurry discharged from a sub-supply line installed at the center of the manifold with respect to the TD, and $F_{side}$ denotes the flow rate of electrode slurry discharged from a sub-supply line installed at the side of the manifold with respect to the TD.

Meanwhile, in the electrode slurry coating method according to the present disclosure, the controlling of the flow rate of electrode slurry supplied through a supply line may include setting a reference temperature, and the reference temperature may be set in the range of 20° C. to 26° C.

Advantageous Effects

With the electrode slurry coating system capable of controlling the flow rate of electrode slurry and the electrode slurry coating method using the same according to the present disclosure, by controlling the flow rate of electrode slurry supplied to a supply line in each region in response to the temperature of the electrode slurry discharged from a slot die during electrode slurry coating, it is possible to easily control the loading amount of the electrode slurry.

Thus, the present disclosure has an advantage in that uniform electrode slurry coating is possible.

BRIEF DESCRIPTION OF THE DRAWINGS

FIG. 1 is a diagram showing a process of discharging an electrode slurry, through an electrode slurry slot die, onto an electrode current collector positioned on a coating roller according to a conventional method.

FIGS. 2 and 3 are diagrams schematically showing the deformation of the electrode slurry slot die according to the temperature of the electrode slurry during conventional electrode manufacturing.

FIG. 4 is a schematic diagram illustrating an electrode slurry coating system according to an embodiment of the present disclosure.

FIG. 5 is a front view of an electrode slurry coating system according to one embodiment of the present disclosure.

FIG. 6 is a front view of an electrode slurry coating system according to another embodiment of the present disclosure.

FIG. 7 is a front view of an electrode slurry coating system according to still another embodiment of the present disclosure.

Best Modes

Hereinafter, the present disclosure will be described in detail. Prior to this, terms and words used in the present specification and claims should not be interpreted with their usual or dictionary meanings but should be interpreted as having meanings and concepts consistent with the technical spirit of the present disclosure on the basis of the principle that an inventor can appropriately define the concepts of terms so as to explain his or her disclosure in the best way.

The present disclosure provides an electrode slurry coating system capable of controlling the flow rate of electrode slurry. In one example, an electrode slurry coating system according to the present disclosure includes a supply tank configured to supply an electrode slurry, a supply line configured to supply the electrode slurry, received from the supply tank, to a manifold of an electrode slurry slot die, the supply line branched into n (n is an integer greater than or equal to three) sub-supply lines in the TD, where the center and sides of the manifold are arranged with respect to the TD, an electrode slurry slot die configured to discharge the electrode slurry supplied through the supply line, a coating roller configured to support and transfer a current collector layer, the current collector layer transferred along the coating roller and having one or both sides coated with the electrode slurry discharged from the electrode slurry slot die, and a temperature sensor configured to measure the temperature of the electrode slurry discharged from the electrode slurry slot die.

In particular, a control valve is configured to control the flow rate of the electrode slurry in response to a temperature of the electrode slurry measured by the temperature sensor.

According to the present disclosure, it was confirmed that the electrode slurry discharge unit, from which the electrode slurry was discharged, was displaced or deformed according to the temperature of the electrode slurry discharged from the electrode slurry slot die. In this case, the loading amount of electrode slurry coated on the current collector is also not constant with respect to the TD. In particular, when the distance between the electrode slurry discharge unit and the coating roller is greater than a reference distance, the loading amount of electrode slurry in a corresponding region exceeds a reference value, and when the distance between the electrode slurry discharge unit and the coating roller is smaller than the reference distance, the loading amount of electrode slurry in the region is less than the reference value. Accordingly, the present disclosure controls the flow rate of the electrode slurry supplied to the corresponding region to correspond to the displacement or deformation of the electrode slurry discharge unit according to the temperature of the electrode slurry.

Specifically, the electrode slurry slot die is designed based on the case where the temperature of the electrode slurry is a specific temperature, for example, 23° C. However, in an actual process, the discharge temperature of the electrode slurry varies in the range of, for example, 20° C. to 26° C. This change in the discharge temperature of the electrode slurry causes a slight deformation or displacement of a discharge unit of the electrode slurry slot die. More specifically, depending on the temperature of the electrode slurry, the electrode slurry discharge unit of the electrode slurry slot die shows different degrees of thermal expansion due to structural differences between the center and both sides. Also, the loading amount of electrode slurry coated on the current collector on the basis of the TD varies depending on the thermal expansion of the center and both sides in the electrode slurry discharge unit. For example, when the temperature of the electrode slurry is designed based on the case of 23° C. and the discharge temperature of the electrode slurry exceeds 23° C., the electrode slurry slot die is thermally expanded on both sides. In addition, the spacings between the coating roller and both sides of the slot die decrease, so that the loading amount of the electrode slurry is larger at the center in the TD than on both sides. Accordingly, the electrode slurry coating system according to the present disclosure includes an electrode slurry slot die to which a supply line branched into n (n is 3 or more) sub-supply lines is connected in the TD and includes a control valve capable of controlling the flow rate in each supply line according to the slurry temperature. Here, n may be selected from the range of 3 to 50, 3 to 25, 3 to 15, or 3 to 9. According to the present disclosure, by controlling the flow rate of electrode slurry supplied to the supply line of each region in response to the temperature of the electrode slurry discharged from the slot die during electrode slurry coating, it is possible to easily control the loading amount of the electrode slurry.

The inventors of the present disclosure confirmed, through various and repeated experiments and observations, that when the temperature of the electrode slurry discharged from the slot die was lower than the reference value, the discharge unit was contracted to a greater degree on both sides than at the center. Conversely, the inventors of the present disclosure confirmed that when the temperature of the electrode slurry discharged from the slot die was higher than the reference value, the discharge unit was expanded to a greater degree on both sides than at the center.

In the present disclosure, the term "center" refers to an intermediate point based on the length in the TD or the width direction of the electrode slurry slot die or the coating roller. Also, the term "side" refers to a point corresponding to 10% and/or 90% based on the length in the TD or the width direction of the electrode slurry slot die or the coating roller. For example, the gap or temperature of the "side" of the roller represents the average of values measured at 10% and 90% on the basis of the length in the TD or the width direction of the roller.

In a specific example, the electrode slurry coating system according to the present disclosure controls the control valve so that the flow rate of the electrode slurry supplied through each supply line satisfies Equation 1 below when the temperature of the electrode slurry measured by the temperature sensor exceeds a preset reference temperature.

$$F_{center} < F_{side}$$ [Equation 1]

In Equation 1, $F_{center}$ denotes the flow rate of electrode slurry discharged from a sub-supply line installed at the center with respect to the TD, and $F_{side}$ denotes the flow rate of electrode slurry discharged from a sub-supply line installed on a side with respect to the TD.

Meanwhile, the flow rates of the control valves installed at the center and on the side may be controlled within 10%. However, the present disclosure is not limited thereto. Furthermore, the control valve is controlled so that the flow rate is greater on the side of the electrode slurry slot die than at the center with respect to the TD, but when the number of sub-supply lines exceeds three, the control value may be controlled so that the flow rate increases sequentially or gradually from the center to the side.

In another specific example, when the temperature of the electrode slurry measured by the temperature sensor is less than a preset reference temperature, the control valve controls the flow rate of electrode slurry supplied through each sub-supply line to satisfy Equation 2 below.

$$F_{center} > F_{side} \qquad \text{[Equation 2]}$$

In Equation 2, $F_{center}$ denotes the flow rate of electrode slurry discharged from a sub-supply line installed at the center with respect to the TD, and $F_{side}$ denotes the flow rate of electrode slurry discharged from a sub-supply line installed on a side with respect to the TD.

Even in this case, the flow rates of the control valves installed at the center and side may be controlled within 10%. However, the present disclosure is not limited thereto. Furthermore, the control valve controls the flow rate such that the flow rate is greater at the center of the electrode slurry slot die than that on the side with respect to the TD, but when the number of supply lines exceeds three, the control value may be controlled so that the flow rate increases sequentially or gradually from the side to the center.

In another example, the electrode slurry slot die in the electrode slurry coating system according to the present disclosure further includes k (k is an integer greater than or equal to three) distance sensors arranged in the TD in the electrode slurry discharge unit from which an electrode slurry is discharged. In this case, the distance sensors measure the gap between the electrode slurry discharge unit and the surface of the coating roller. The number of multiple distance sensors may correspond to the number of branched supply lines, and the distance sensors may be positioned on the same level.

In addition, the multiple distance sensors may be arranged in the electrode slurry discharge unit and positioned upstream with respect to the traveling direction of the current collector. A region of the electrode current collector which is not coated with the electrode slurry may be referred to as an upstream direction. Meanwhile, the distance sensor may be an infrared or ultrasonic distance sensor that measures the distance between the measurement region and the coating roller.

Specifically, when the gap $G_{center}$ measured by the distance sensor installed at the center of the slurry discharge unit is greater than the gap $G_{side}$ measured by the distance sensor installed on the side of the slurry discharge unit with respect to the TD, the control valve is controlled so that the flow rate of the electrode slurry supplied through each sub-supply line satisfies Equation 1 below.

$$F_{center} < F_{side} \qquad \text{[Equation 1]}$$

In Equation 1, $F_{center}$ denotes the flow rate of electrode slurry discharged from a sub-supply line installed at the center with respect to the TD, and $F_{side}$ denotes the flow rate of electrode slurry discharged from a sub-supply line installed on a side with respect to the TD.

Alternatively, when the gap $G_{center}$ measured by the distance sensor installed at the center of the slurry discharge unit is smaller than the gap $G_{side}$ measured by the distance sensor installed on the side of the slurry discharge unit with respect to the TD, the control valve is controlled so that the flow rate of the electrode slurry supplied through each sub-supply line satisfies Equation 2.

$$F_{center} > F_{side} \qquad \text{[Equation 2]}$$

In Equation 2, $F_{center}$ denotes the flow rate of electrode slurry discharged from a sub-supply line installed at the center with respect to the TD, and $F_{side}$ denotes the flow rate of electrode slurry discharged from a sub-supply line installed on a side with respect to the TD.

The flow rates of the control valves installed at the center and side may be controlled within 10%. However, the present disclosure is not limited thereto. Accordingly, according to the present disclosure, it is possible to control the difference in the loading amount of the electrode slurry in the width direction to be 5 (mg/25 cm$^2$) or less.

Also, the present disclosure provides an electrode slurry coating method using the above-described electrode slurry coating system. In one example, the electrode slurry coating method according to the present disclosure controls the flow rate of electrode slurry supplied through each sub-supply line according to the temperature of electrode slurry measured by a temperature sensor. In a specific example, when the temperature of the electrode slurry measured by the temperature sensor exceeds the preset reference temperature, the control valve is controlled so that the flow rate of electrode slurry supplied through each sub-supply line satisfies Equation 1 above.

Alternatively, when the temperature of the electrode slurry measured by the temperature sensor is less than the preset reference temperature, the control valve is controlled so that the flow rate of electrode slurry supplied through each supply line satisfies Equation 2 above.

In a specific example, the above-described preset reference temperature is in the range of 22° C. to 24° C., for example, 23° C. When the temperature of electrode slurry discharged from the slot die is lower than a reference value (23° C.), the discharge unit is contracted to a greater degree on both sides than at the center. Also, the gap between the coating roller and the center of the slot die decreases, so that the loading amount of electrode slurry is larger on both sides in the TD than at the center. Thus, the present disclosure controls the flow rate of the control valve located in each region. For example, when the electrode slurry is supplied, a flow rate is larger at the center than on sides with respect to the TD. On the other hand, when the temperature of electrode slurry discharged from the slot die is higher than a reference value (23° C.), the discharge unit is expanded to a greater degree on both sides than at the center. In this case, when the electrode slurry is supplied, the flow rate is larger on the sides than at the center with respect to the TD.

In one example, the preset reference temperature may be set in the range of 20° C. to 26° C. In a specific example, the preset reference temperature is in the range of 22° C. to 24° C., for example, 23° C.

In a specific example, an electrode to be manufactured in the present disclosure is an electrode for a pouch-type secondary battery. Also, the electrode slurry collectively refers to a composition of a slurry state including an electrode active material. The positive electrode or the negative electrode refers to an electrode for a secondary battery, and particularly, an electrode for a lithium secondary battery.

In one example, the electrode refers to a positive electrode and/or a negative electrode of the lithium secondary battery.

The positive electrode has a structure in which a positive electrode active material layer having a two-layer structure is stacked on a positive electrode current collector. In one example, the positive electrode active material layer includes a positive electrode active material, a conductive material, a binder polymer, etc., and if necessary, may further include a positive electrode additive commonly used in the art.

Positive electrode active materials may be lithium-containing oxides and may be the same or different. As the lithium-containing oxide, a lithium-containing transition metal oxide may be used.

For example, the lithium-containing transition metal oxide may be any one selected from the group consisting of $Li_xCoO_2(0.5<x<1.3)$, $Li_xNiO_2(0.5<x<1.3)$, $Li_xMnO_2$ $(0.5<x<1.3)$, $Li_xMn_2O_4(0.5<x<1.3)$, $Li_x(Ni_aCo_bMn_c)O_2$ $(0.5<x<1.3, \ 0<a<1, \ 0<b<1, \ 0<c<1, \ a+b+c=1)$, $Li_xNi_{1-y}Co_yO_2(0.5<x<1.3, \ 0<y<1)$, $Li_xCO_{1-y}Mn_yO_2$ $(0.5<x<1.3, 0\leq y<1)$, $Li_xNi_{1-y}Mn_yO_2(0.5<x<1.3, 0\leq y<1)$, $Li_x$ $(Ni_aCo_bMn_c) \ O_4(0.5<x<1.3, \ 0<a<2, \ 0<b<2, \ 0<c<2, \ a+b+$ $c=2)$, $Li_xMn_{2-z}Ni_zO_4(0.5<x<1.3, \ 0<<2)$, $Li_xMn_{2-z}CO_2O_4$ $(0.5<x<1.3, \ 0<z<2)$, $Li_xCoPO_4(0.5<x<1.3)$, and $Li_xFePO_4$ $(0.5<x<1.3)$, and a mixture of two or more thereof. The lithium-containing transition metal oxide may be coated with metal such as aluminum (Al) or a metal oxide. Also, at least one selected from the group consisting of sulfides, selenides, and halides may be used in addition to the lithium-containing transition metal oxide.

The positive electrode active material may be contained in the positive electrode active material layer in the range of 94.0 wt % to 98.5 wt %. When the content of the positive electrode active material satisfies the above range, it is advantageous in terms of manufacturing a high-capacity battery and providing sufficient positive electrode conductivity or adhesion between electrode materials.

The current collector used for the positive electrode is a metal with high conductivity, and any metal that can be easily adhered to a positive electrode active material slurry and that has no reactivity in the voltage range of the electrochemical device may be used. Specifically, non-limiting examples of the current collector for the positive electrode include a foil made of aluminum, nickel, or a combination thereof.

The positive electrode active material layer further includes a conductive material. The conductive material is typically added in the range of 1 wt % to 30 wt % with respect to the total weight of the mixture containing the positive active material. The conductive material is not particularly limited as long as it has conductivity without causing chemical changes in secondary batteries. For example, at least one selected from the group consisting of graphite such as natural graphite or artificial graphite, carbon black such as carbon black, acetylene black, Ketjen black, channel black, furnace black, lamp black, and summer black, conductive fibers such as carbon fibers and metal fibers, metal powders such as carbon fluoride, aluminum, and nickel powders, conductive whiskeys such as zinc oxide and potassium titanate, conductive metal oxides such as titanium oxide, and polyphenylene derivatives may be used as the conductive material.

The negative electrode has a structure in which a negative electrode active material layer having a two-layer structure is stacked on a negative electrode current collector. In one example, the negative electrode active material layer includes a negative electrode active material, a conductive material, a binder polymer, etc., and if necessary, may further include a negative electrode additive commonly used in the art.

The negative electrode additive may include a carbon material, lithium metal, silicon, or tin. When a carbon material is used as the negative electrode active material, both low-crystalline carbon and high-crystalline carbon may be used. Soft carbon and hard carbon are representative of the low-crystalline carbon, and at least one type of high-temperature baked carbon selected from the group consisting of natural graphite, Kish graphite, pyrolytic carbon, mesophase pitch based carbon fiber, mesocarbon microbeads, mesophase pitches, and petroleum or coal tar pitch derived cokes is representative of the high-crystalline carbon.

Non-limiting examples of the current collector for the negative electrode include a foil made of copper, gold, nickel, a copper alloy, or a combination thereof. Also, the current collector may be used by stacking substrates made of the above materials.

Also, the negative electrode may include a conductive material and a binder commonly used in the art.

MODES FOR CARRYING OUT THE INVENTION

Hereinafter, the present disclosure will be described in detail with reference to the accompanying drawings. The present disclosure may be variously modified and have several forms, and specific embodiments will be shown in the accompanying drawings and described in detail below. However, this is not intended to limit the present disclosure to specific embodiments, and it should be understood that the present disclosure encompasses any modifications, equivalents and substitutes included in the spirit and scope of the present disclosure.

First Embodiment

FIG. 4 is a schematic diagram showing an electrode slurry coating system according to an embodiment of the present disclosure.

Referring to FIG. 4, an electrode slurry coating system 100 according to the present disclosure includes a supply tank 110 configured to supply an electrode slurry, a supply line 130 configured to supply the electrode slurry supplied by the supply tank 110 to a manifold 121 of an electrode slurry slot die120, the supply line 130 branched into n (n is an integer greater than or equal to three) sub-supply lines in the TD, an electrode slurry slot die 120 configured to discharge the electrode slurry supplied through the supply line 130, a coating roller 140 configured to support and transfer a current collector layer 150, the current collector layer 150 transferred along the coating roller 140 and having one or both sides coated with the electrode slurry discharged from the electrode slurry discharge unit 122 from the electrode slurry slot die 120, and a temperature sensor 160 configured to measure the temperature of the electrode slurry discharged from the electrode slurry slot die 120. Specifically, the temperature sensor 160 is a non-contact temperature sensor. The temperature sensor 160 may measure, in real time, the temperature of the electrode slurry discharged in a non-contact manner. For example, the temperature sensor 160 measures the temperature of the discharged electrode slurry continuously or at regular intervals.

As the temperature sensor 160, a commercially available infrared temperature sensor or thermal imaging camera may be used.

At this time, the supply line 130 includes a control valve 133 for receiving the temperature value of the electrode slurry measured by the temperature sensor 160 and controlling the flow rate of the electrode slurry. In FIG. 4, the supply line 130 has a structure in which a single line 131 protrudes from the supply tank 110 and is branched into n sub-supply lines 132, but the present disclosure is not limited thereto. In this case, the supply line 130 may have a structure in which the single line 131 protrudes from the supply tank 110 and may have a structure in which the single line 131 is branched into the n sub-supply lines 132 and coupled to a manifold 121 of the electrode slurry slot die 120.

In addition, the supply line 130 includes at least one pump 134 for pumping the electrode slurry from the supply tank 110 to the electrode slurry slot die 120.

Meanwhile, the control valve 133 may be installed at each of the n supply lines 130 or sub-supply lines 132 having a structure branched in the TD of the electrode slurry slot die to individually control the flow rate of the electrode supply supplied through the corresponding supply line 130. In FIG. 4, the sub-supply line 132 is shown as being branched into five, but the present disclosure is not limited thereto. Also, each control value 133 receives the temperature value of the electrode slurry measured by the temperature sensor 160 and controls the flow rate of the electrode slurry for each section.

Second Embodiment

FIG. 5 is a front view of an electrode slurry coating system 200 according to an embodiment of the present disclosure. FIG. 5 is a case in which the temperature of discharged electrode slurry is 26° C., which is higher than a design reference value of an electrode slurry slot die 220, i.e., 23° C. When the temperature of electrode slurry discharged from the electrode slurry slot die 220 is higher than the reference value (23° C.), an electrode slurry discharge unit 222 is expanded to a greater degree on both sides than at the center.

In this case, the distance between the electrode slurry slot die 220 and a coating roller 240 is greater at the center of the slot die 220 than on the side of the slot die 220 with respect to the TD, and thus the loading amount of slurry is larger at the center of the current collector layer than on the side with respect to the TD. In order to prevent this, according to the present disclosure, by controlling a control valve installed at a supply line of each region, the flow rate of electrode slurry supplied through the supply line of the corresponding region is controlled. Specifically, the control valve is controlled so that the flow rate of the electrode slurry supplied through the corresponding supply line satisfies Equation 1 below.

$$F_{center} < F_{side} \qquad \text{[Equation 1]}$$

In Equation 1, $F_{center}$ denotes the flow rate of electrode slurry discharged from a supply line installed at the center with respect to the TD, and $F_{side}$ denotes the flow rate of electrode slurry discharged from a supply line installed on a side with respect to the TD.

The flow rates of the control valves installed at the center and side may be controlled within 10%. However, the present disclosure is not limited thereto. Furthermore, the control valve is controlled so that the flow rate is greater on the side of the electrode slurry slot die 220 than at the center with respect to the TD, but the control value may be controlled so that the flow rate increases sequentially or gradually from the center to the side.

Third Embodiment

FIG. 6 is a front view of an electrode slurry coating system 300 according to another embodiment of the present disclosure.

FIG. 6 is a case in which the temperature of discharged electrode slurry is 20° C., which is lower than a design reference value of an electrode slurry slot die 320, i.e., 23° C. When the temperature of electrode slurry discharged from the electrode slurry slot die 320 is lower than the reference value (23° C.), the electrode slurry discharge unit is contracted to a greater degree on both sides than at the center.

In this case, the distance between the electrode slurry slot die 320 and a coating roller 340 is greater on the side of the slot die 320 than at the center of the slot die 320 with respect to the TD, and thus the loading amount of slurry is larger on the side of the current collector layer than at the center with respect to the TD. In order to prevent this, according to the present disclosure, by controlling a control valve installed at a supply line of each region, the flow rate of electrode slurry supplied through the supply line of the corresponding region is controlled. Specifically, the control valve is controlled so that the flow rate of the electrode slurry supplied through the corresponding supply line satisfies Equation 2 below.

$$F_{center} > F_{side} \qquad \text{[Equation 2]}$$

In Equation 2, $F_{center}$ denotes the flow rate of electrode slurry discharged from a supply line installed at the center with respect to the TD, and $F_{side}$ denotes the flow rate of electrode slurry discharged from a supply line installed on a side with respect to the TD.

The flow rates of the control valves installed at the center and side may be controlled within 10%. However, the present disclosure is not limited thereto. Furthermore, the control valve is controlled so that the flow rate is greater at the center of the electrode slurry slot die 320 than on the side with respect to the TD, but the control value may be controlled so that the flow rate increases sequentially or gradually from the side to the center.

Fourth Embodiment

FIG. 7 is a front view of an electrode slurry coating system according to still another embodiment of the present disclosure.

Referring to FIG. 7, an electrode slurry slot die 420 in an electrode slurry coating system 400 according to the present disclosure further includes k (k is an integer greater than or equal to three) distance sensors 470 arranged in the TD in the electrode slurry discharge unit from which an electrode slurry is discharged. In this case, the distance sensor 470 measures the gap between an electrode slurry discharge unit 422 and a coating roller 440. Although not shown in FIG. 7, the number of multiple distance sensors 470 may correspond to the number of branched supply lines, and the distance sensors may be positioned on the same level.

In addition, the multiple distance sensors 470 may be arranged in the electrode slurry discharge unit 422 and positioned upstream with respect to the traveling direction of the current collector. In the drawing, a region of the electrode current collector 450 which is not coated with the electrode slurry may be referred to as an upstream direction. Meanwhile, the distance sensor 470 may be an infrared or ultrasonic distance sensor that measures the distance between the measurement region and the coating roller 440.

Specifically, when the gap $G_{center}$ measured by the distance sensor 470 installed at the center of the slurry discharge unit 422 is greater than the gap $G_{side}$ measured by the distance sensor 470 installed on the side of the slurry discharge unit 422 with respect to the TD, the control valve 433 is controlled so that the flow rate of the electrode slurry supplied through each supply line satisfies Equation 1 below.

$$F_{center} < F_{side} \qquad \text{[Equation 1]}$$

In Equation 1, $F_{center}$ denotes the flow rate of electrode slurry discharged from a supply line installed at the center with respect to the TD, and $F_{side}$ denotes the flow rate of electrode slurry discharged from a supply line installed on a side with respect to the TD.

Alternatively, when the gap $G_{center}$ measured by the distance sensor installed at the center of the slurry discharge unit is smaller than the gap $G_{side}$ measured by the distance sensor installed on the side of the slurry discharge unit with respect to the TD, the control valve 433 is controlled so that the flow rate of the electrode slurry supplied through each supply line satisfies Equation 2.

$$F_{center} > F_{side} \qquad \text{[Equation 2]}$$

In Equation 2, $F_{center}$ denotes the flow rate of electrode slurry discharged from a supply line installed at the center with respect to the TD, and $F_{side}$ denotes the flow rate of electrode slurry discharged from a supply line installed on a side with respect to the TD.

The flow rates of control valves 433 installed at the center and side may be controlled within 10%. However, the present disclosure is not limited thereto. Accordingly, according to the present disclosure, it is possible to control the difference in the loading amount of the electrode slurry in the width direction to be 5 (mg/25 cm²) or less.

The present disclosure has been described above in more detail through the drawings and embodiments. However, the configurations shown in the drawings or embodiments of the present specification are just embodiments of the present disclosure and do not represent all the technical spirit of the present disclosure. Therefore, it should be understood that there may be various equivalents and modifications which can replace the configurations at the time of filing.

DESCRIPTION OF REFERENCE NUMERALS

10: Electrode current collector
11: Electrode mixture layer
20: Electrode slurry slot die
21: Electrode slurry discharge unit
30: Coating roller
100, 200, 300, 400: Electrode slurry coating system
110: Supply tank
120, 220, 320, 420: Electrode slurry slot die
121: Manifold
122, 222, 422: Electrode slurry discharge unit
130: Supply line
131: Single line
132: Sub-supply line
133, 433: Control valve
134: pump
140, 240, 340, 440: Coating roller
150, 450: Current collector layer
160: Temperature sensor
470: Distance sensor

The invention claimed is:

1. An electrode slurry coating system, comprising:
a supply tank;
a supply line having a control valve and branching into at least three sub-supply lines at one end thereof;
an electrode slurry slot die having a manifold;
a coating roller; and
a temperature sensor,
wherein the supply tank is configured to supply an electrode slurry,
wherein the supply line configured to receive the electrode slurry from the supply tank and provide the electrode slurry to the manifold of the electrode slurry slot die through the at least three sub-supply lines,
wherein the at least three sub-supply lines are arranged with respect to a transverse direction (TD), wherein the center and sides of the manifold are arranged with respect to the TD,
wherein the electrode slurry slot die is configured to discharge the electrode slurry supplied through the manifold to a current collector layer supported and transferred by the coating roller, wherein one or both sides of the current collector layer can be coated by the electrode slurry discharged from the electrode slurry slot die,
wherein the temperature sensor is configured to measure the temperature of the electrode slurry discharged at an opening of the electrode slurry slot die, and
wherein the control valve is configured to control the flow rate of the electrode slurry in response to a temperature of the electrode slurry measured by the temperature sensor.

2. The electrode slurry coating system of claim 1, wherein, when the temperature of the electrode slurry measured by the temperature sensor exceeds a preset reference temperature, the control valve controls the flow rate of the electrode slurry to satisfy Equation 1 below:

$$F_{center} < F_{side} \qquad \text{[Equation 1]}$$

where in Equation 1, $F_{center}$ denotes the flow rate of electrode slurry discharged from a sub-supply line arranged at the center of the manifold with respect to the TD, and $F_{side}$ denotes the flow rate of electrode slurry discharged from a sub-supply line arranged at a side of the manifold with respect to the TD.

3. The electrode slurry coating system of claim 1, wherein, when the temperature of the electrode slurry measured by the temperature sensor is less than a preset reference temperature, the control valve controls the flow rate of the electrode slurry to satisfy Equation 2 below:

$$F_{center} > F_{side} \qquad \text{[Equation 2]}$$

where in Equation 2, $F_{center}$ denotes the flow rate of electrode slurry discharged from a sub-supply line arranged at the center of the manifold with respect to the TD, and $F_{side}$ denotes the flow rate of electrode slurry discharged from a sub-supply line arranged at a side of the manifold with respect to the TD.

4. The electrode slurry coating system of claim 1, wherein the electrode slurry slot die further comprises an electrode slurry discharge unit having at least three distance sensors arranged along the TD,
wherein the electrode slurry discharge unit is configured to discharge the electrode slurry, and
wherein each of the at least three distance sensors measures a gap between the electrode slurry discharge unit and a surface of the coating roller.

5. The electrode slurry coating system of claim 4, wherein the at least three distance sensors are positioned upstream with respect to a traveling direction of the current collector layer when present on the coating roller.

6. The electrode slurry coating system of claim 4, wherein when a gap ($G_{center}$) measured by a distance sensor arranged at a center of the slurry discharge unit is greater than a gap ($G_{side}$) measured by a distance sensor arranged at a side of the slurry discharge unit along the TD, the control valve controls the flow rate of the electrode slurry to satisfy Equation 1 below:

$$F_{center} < F_{side} \qquad \text{[Equation 1]}$$

where in Equation 1, $F_{center}$ denotes the flow rate of electrode slurry discharged from a sub-supply line arranged at the center of the manifold with respect to the TD, and $F_{side}$ denotes the flow rate of electrode slurry discharged from a sub-supply line arranged at a side of the manifold with respect to the TD.

7. The electrode slurry coating system of claim 4, wherein, when a gap ($G_{center}$) measured by a distance sensor arranged at the center of the slurry discharge unit is smaller than a gap ($G_{side}$) measured by a distance sensor arranged at a side of the slurry discharge unit along the TD, the control valve controls the flow rate of the electrode slurry supplied through the supply line to satisfy Equation 2 below:

$$F_{center} > F_{side} \qquad \text{[Equation 2]}$$

where in Equation 2, $F_{center}$ denotes the flow rate of electrode slurry discharged from a sub-supply line arranged at the center of the manifold with respect to the TD, and $F_{side}$ denotes the flow rate of electrode slurry discharged from a sub-supply line arranged at the side of the manifold with respect to the TD.

8. The electrode slurry coating system of claim 1, wherein the opposite end of the supply line has a single line receiving the electrode slurry from the supply tank.

9. The electrode slurry coating system of claim 1, wherein the supply line comprises at least one pump configured to pump the electrode slurry from the supply tank to the electrode slurry slot die.

10. An electrode slurry coating method using the electrode slurry coating system of claim 1, the electrode slurry coating method comprising:

controlling a flow rate of an electrode slurry supplied through the supply line based on the temperature of the electrode slurry measured by the temperature sensor.

11. The electrode slurry coating method of claim 10, wherein, when the temperature of the electrode slurry measured by the temperature sensor exceeds a preset reference temperature, the control valve controls the flow rate of the electrode slurry supplied through the supply line to satisfy Equation 1 below:

$$F_{center} < F_{side} \text{[Equation 1]}$$

where in Equation 1, $F_{center}$ denotes the flow rate of electrode slurry discharged from a sub-supply line arranged at the center of the manifold with respect to a TD, and $F_{side}$ denotes the flow rate of electrode slurry discharged from a sub-supply line arranged at a side of the manifold with respect to the TD.

12. The electrode slurry coating method of claim 10, wherein, when the temperature of the electrode slurry measured by the temperature sensor is less than a preset reference temperature, the control valve controls the flow rate of the electrode slurry supplied through the supply line to satisfy Equation 2 below:

$$F_{center} > F_{side} \text{[Equation 2]}$$

where in Equation 2, $F_{center}$ denotes the flow rate of electrode slurry discharged from a sub-supply line arranged at at the center of the manifold with respect to the TD, and $F_{side}$ denotes the flow rate of electrode slurry discharged from a sub-supply line arranged at a side of the manifold with respect to the TD.

13. The electrode slurry coating method of claim 10, wherein the flow rate of electrode slurry supplied through a supply line is controlled based on a preset reference temperature, and the preset reference temperature ranges from 20° C. to 26° C.

* * * * *